United States Patent Office 2,838,542
Patented June 10, 1958

2,838,542
6-FLUORO STEROIDS AND PROCESS

George B. Spero, Kalamazoo Township, Kalamazoo County, Barney J. Magerlein, Kalamazoo, and William P. Schneider and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,528

8 Claims. (Cl. 260—397.45)

This invention relates to novel steroids, 6-fluoro-11β,17α-dihydroxy-1,4-pregnadiene-3,20-diones and 6-fluoro-17α-hydroxy-1,4-pregnadiene-3,11,20-triones, and to intermediates and processes for making the same. It relates particularly to 6α-fluoro-11β,17α-dihydroxy-1,4-pregnadiene-3,20-dione (1-dehydro-21-desoxy-6α-fluorohydrocortisone) and 6α-fluoro-17α-hydroxy-1,4-pregnadiene-3,11,20-trione (1-dehydro-21-desoxy-6-α-fluorocortisone), intermediates in the production thereof and processes for their production.

The novel 1-dehydro-21-desoxy-6-fluorohydrocortisones and 1-dehydro-21-desoxy-6-fluorocortisones possess a high order of glucocorticoid and anti-inflammatory activity. They are useful in the treatment of various arthritic conditions and in the control of inflammatory conditions due to bacterial infections or allergic reactions of skin or mucous membranes. The compounds cause a loss of salt and water which makes them especially valuable in the management of chronic congestive heart failure and in the treatment of cirrhosis of the liver, the nephrotic syndrome and the treatment of eclampsia and pre-eclampsia. For example, 1-dehydro-21-desoxy-6α-fluorohydrocortisone has glucocorticoid activity of about seven times that of Kendall's compound F and anti-inflammatory activity of about eight times that of Kendall's compound F.

The new compounds and the process of the present invention are illustratively represented by the following flow sheet and formulae:

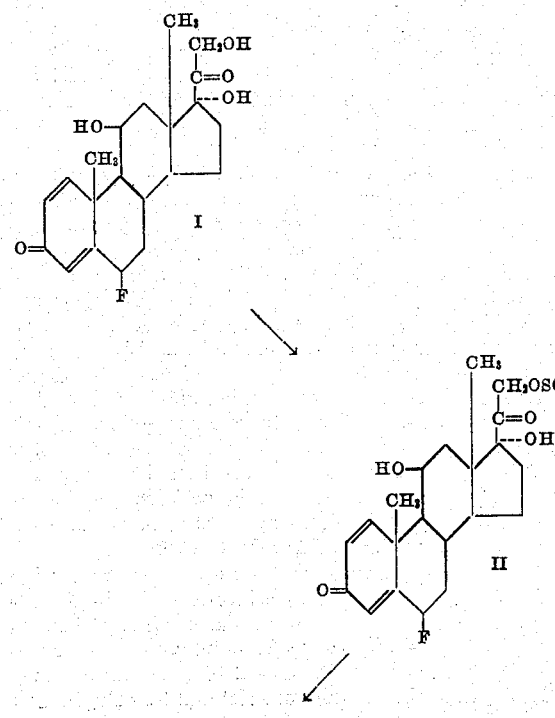

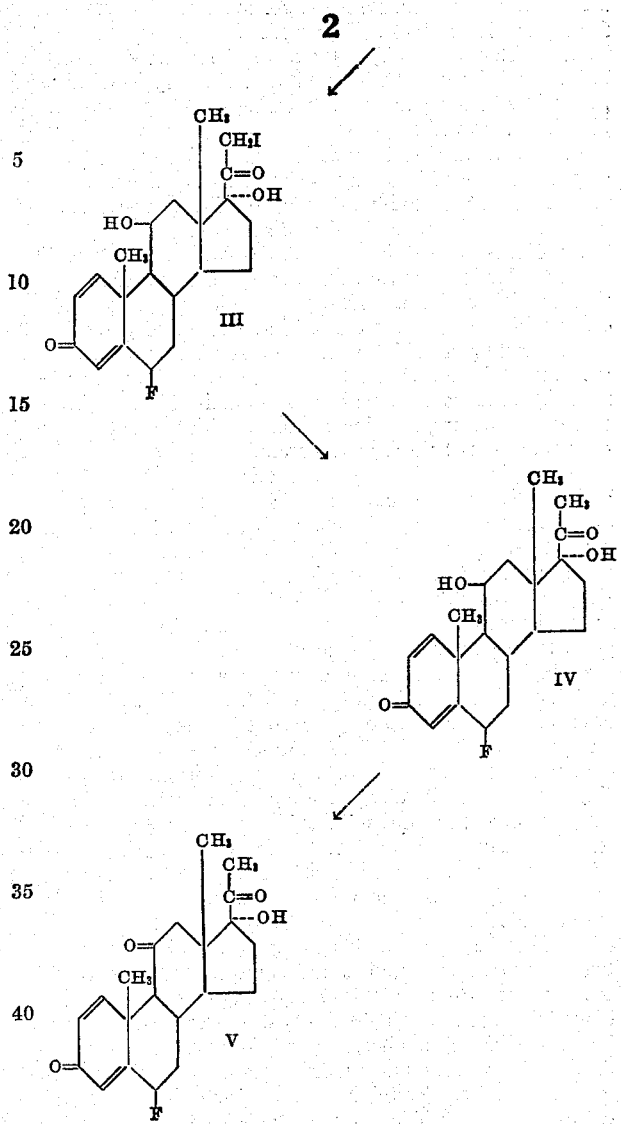

wherein R is an organic radical, particularly a hydrocarbon radical of up to and including ten carbon atoms, such as ethyl, phenyl, tolyl, naphthyl, or the like, with methyl preferred.

The process of the present invention comprises treating 6-fluoro-11β,17α,21-trihydroxy-1,4-pregnadiene-3,20-dione (Δ¹-6-fluorohydrocortisone) (I) with an organic sulfonyl halide to obtain the corresponding 21-ester (II), a 21-alkyl or 21-arylsulfonate of 6-fluoro-11β,17α,21-trihydroxy-1,4-pregnadiene-3,20-dione. Treating the thus-produced 21-alkyl or arylsulfonate of 6-fluoro-11β,17α,21-trihydroxy-1,4-pregnadiene-3,20-dione (II) with an iodinating agent yields 6-fluoro-11β,17α-dihydroxy-21-iodo-1,4-pregnadiene-3,20-dione (III). Treating the thus-obtained 6-fluoro-21-iodo-11β,17α-dihydroxy-1,4-pregnadiene-3,20-dione (III) with a reducing agent to dehalogenate at the 21-position yields 6-fluoro-11β,17α-dihydroxy-1,4-pregnadiene-3,20-dione (IV), which on oxidation gives 6-fluoro-17α-hydroxy-1,4-pregnadiene-3,11,20-trione (V).

Similarly, when the 11-keto analogue (1-dehydro-6-fluorocortisone) is utilized as starting material in the above series of reactions, 6-fluoro-17β-hydroxy-1,4-pregnadiene-3,11,20-trione (V) is produced directly without the step of oxidation of the 11β-hydroxyl.

Administration of the novel steroids can be in conventional dosage forms, such as pills, tablets, capsules, syrups or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides or other materials forming advantageous combinations therewith.

As will hereinafter be described in greater detail, these compounds are additionally useful as intermediates in the production of 6,9α-difluoro-11β,17α-dihydroxy-1,4-pregnadiene-3,20-dione and 6,9α-difluoro-17α-hydroxy-1,4-pregnadiene-3,11,20-trione. The 9α-halo derivatives are of particular importance because they possess a combination of high anti-inflammatory and glucocorticoid properties with low concomitant mineralocorticoid activities.

The starting steroids for the compounds and process of the present invention are 6α-fluorohydrocortisone or 6β-fluorohydrocortisone or the corresponding 11-keto analogues and are prepared in accordance with the procedures of Preparations 1 through 11 herein.

In carrying out the process of this invention, 6-fluorohydrocortisone of 6-fluorocortisone is treated with an organic acid sulfonyl halide such as methanesulfonyl chloride, toluenesulfonyl chloride, toluenesulfonyl bromide, benzenesulfonyl chloride, naphthylsulfonyl chloride, or the like, the methanesulfonic acid halides, especially methanesulfonyl chloride, being preferred. In the preferred embodiment, the starting steroid is reacted with the alkyl or aryl sulfonyl halide in a solvent such as pyridine, benzene, toluene, or the like. Sufficient amine base, e. g., pyridine, should be added to react with any halogen acid formed. The sulfonyl halide reaction is conducted at a temperature between minus ten and plus sixty degrees centigrade, providing at the lower temperature the solvent has not solidified. Thus, for pyridine, dioxane, toluene, or the like, temperatures in the range of zero to ten degrees centigrade can be used, while for benzene only temperatures above five degrees centigrade are suitable because of the relatively high melting point of the latter compound. The reaction time is usually between about thirty minutes and eight hours, after which the product, 6-fluoro-11β,17α,21-trihydroxy-1,4-pregnadiene-3,20-dione 21-alkyl or arylsulfonate, is recovered in a conventional manner, such as, for example, by evaporating the solvent until a dry residue is obtained, followed, if desired, by mixing the product with water and extracting the purified material therefrom. For extraction, solvents such as methylene chloride, chloroform, carbon tetrachloride, benzene, ether, toluene, or the like can be used. Removal of the extraction solvent by distillation leaves the crude 21-alkyl or arylsulfonate.

The 21-iodo compound (III) is prepared by reacting the said 21-alkyl or arylsulfonate with sodium, potassium or lithium iodide in an oxygenated hydrocarbon solution, e. g., an alkanone solution, such as acetone. A molar excess of sodium iodide (three to twenty moles of sodium iodide per mole of steroid) is generally preferred for this reaction. The reaction mixture containing the 21-alkyl or arylsulfonate and sodium iodide and acetone is heated to reflux for a period of about three minutes to thirty minutes. The thus-produced 6-fluoro-11β,17α-dihydroxy-21-iodo-1,4-pregnadiene-3,20-dione can then be isolated by evaporating the solvent. For the subsequent reaction, the 21-iodo steroid can be used either in purified form as a product of recrystallization from such organic solvents as acetone, ethanol, Skellysolve B (brand of hexane hydrocarbons), or the like or it can be used in the crude state in the next step of the synthesis.

The 6-fluoro-21-iodo-11β,17α-dihydroxy-1,4-pregnadiene-3,20-dione is then reacted with a reducing agent such as sodium or potassium thiosulfate, bisulfite or sulfite, or zinc and acetic acid, or the like. In the preferred embodiment of the invention, the crude 21-iodide is slurried with zinc and acetic acid and the mixture stirred at room temperature for a period of five minutes to two hours. The product is isolated from the reaction mixture after dilution with water by conventional methods, such as by filtration or extraction with a water-immiscible organic solvent, e. g., ether, benzene, methylene chloride, ethylene chloride, carbon tetrachloride, chloroform, hexane, heptane, or the like, and evaporating the solvent. Purification of the thus-obtained 6-fluoro-11β,17α-dihydroxy-1,4-pregnadiene-3,20-dione is carried out in the usual manner, such as by recrystallization from ether, acetone, methanol, ethanol, Skellysolve B hexanes or the like, or by chromatography.

The oxidation of 6-fluoro-11β,17α-dihydroxy-1,4-pregnadiene-3,20-dione can be carried out by a variety of methods, such as, for example, by oxidizing the said 6-fluoro-21-desoxy steroid in acetic acid solution with chromium trioxide, using molar quantities or a slight excess, or employing a haloamide or haloimide of an acid such as N-bromoacetamide, N-chlorosuccinimide, or N-bromosuccinimide in pyridine, dioxane, or other solvent solutions. After conclusion of the desired oxidation, the oxidant is generally destroyed by addition of methyl alcohol, ethyl alcohol, or the like when chromic acid is the oxidizing agent, and an alkali bisulfite when N-bromosuccinimide or other N-haloacylamides are used. Thereafter 6-fluoro-17α-hydroxy-1,4-pregnadiene-3,11,20-trione (V) is obtained by conventional means, such as extraction with water-immiscible solvents, e. g., methylene chloride, ethylene chloride, chloroform, carbon tetrachloride, ether, benzene, toluene, or the like, and is purified by recrystallization or by chromatography.

As hereinbefore indicated, the compounds of the present invention are additionally useful as intermediates in the production of the valuable 9α-fluoro derivatives by a 9α-halogenation procedure. Thus, 6-fluoro-11β,17α-dihydroxy-1,4-pregnadiene-3,20-dione can be dehydrated with N-bromoacetamide and anhydrous sulfur dioxide in pyridine solution by permitting the reaction to continue until a negative acidified potassium iodide-starch test of the reaction mixture is obtained. Dilution with cold water results in the precipitation of 6-fluoro-17α-hydroxy-1,4,9(11)-pregnatriene-3,20-dione, which can be purified by recrystallization from acetone. The crystalline product can then be reacted in methylene chloride-tertiary butyl alcohol solution with perchloric acid and N-bromoacetamide or N-iodo-succinimide to produce a reaction mixture from which 6-fluoro-9α-bromo-11β,17α-dihydroxy-1,4-pregnadiene-3,20-dione or the corresponding 6-fluoro-9α-iodo compound can be recovered by precipitation with ice water and recrystallization from acetone. The latter steroids can then be reacted in acetone solution with anhydrous potassium acetate at reflux temperatures to produce 6-fluoro-9(11)-oxido-17α-hydroxy-1,4-pregnadiene-3,20-dione, which is recoverable from the reaction mixture by chromatography and can be further purified by recrystallization from Skellysolve B hexanes-acetone. Reaction of the said 9(11)-oxido compound in methylene chloride solution with aqueous hydrogen fluoride or hydrogen fluoride gas in the presence of tetrahydrofuran at room temperature is productive of 6,9α-difluoro-11β,17α-dihydroxy-1,4-pregnadiene - 3,20 - dione. Substitution of aqueous hydrogen chloride for the hydrogen fluoride above yields 6-fluoro-9α-chloro-11β,17α-dihydroxy-1,4-pregnadiene-3,20-dione. If desired, either the 9α-fluoro or chloro product can be oxidized, for example, with N-bromoacetamide in pyridine solution to give 6,9α-difluoro-17α-hydroxy-1,4-pregnadiene-3,11,20-trione or the corresponding 9α-chloro compound.

The steps of the foregoing process for the preparation of the 9α-halo steroids can be inverted without departing from the basic concepts of the process. Thus, 6-fluoro - 11β,17α - dihydroxy - 21 - acyloxy - 1,4 - pregnadiene-3,20-dione, rather than a 21-desoxy steroid, may be employed as the starting material and 9α-halogenation accomplished as indicated above prior to deoxygenation at the 21-position. The 21-acyloxy steroid can be prepared in the manner customarily employed for acylating hydrocortisone, for example, by reaction of the appropriate 21-hydroxy steroid with the anhydride or acid halide of an organic carboxylic acid containing from one of twelve carbon atoms, inclusive, under conventional esterifying conditions. In this variation of the process the 6-fluoro-21-acyloxy steroid can be dehydrated with N-bromoacetamide and anhydrous sulfur dioxide as before to produce 6-fluoro-17α-hydroxy-21-acyloxy-1,4, 9(11)-pregnatriene-3,20-dione, which can then be reacted with N-bromoacetamide or N-iodosuccinimide in an acidic aqueous organic solution to yield 6-fluoro-9α-bromo-11β,17α-dihydroxy-1,4-pregnadiene-3,20-dione or the corresponding 6-fluoro-9α-iodo compound. The said 9α-bromo or 9α-iodo steroid can be reacted with anhydrous potassium acetate to give 6-fluoro-9(11)-oxido-17α-hydroxy-21-acyloxy-1,4-pregnadiene-3,20-dione. Reaction of the 9(11)-oxido steroid with hydrogen fluoride or hydrogen chloride yields 6,9α-difluoro-11β,17α-dihydroxy-21-acyloxy-1,4-pregnadiene-3,20-dione or its 9α-chloro analogue, and hydrolysis, as with potassium bicarbonate, gives the corresponding 21-hydroxy compounds. Either hydrolyzed product can then be oxidized to the 11-keto steroid or subjected to the reaction described herein for obtaining the 21-desoxy steroid, i. e., converting the said 6,9α-difluoro-21-hydroxy steroid to the corresponding 21-alkyl or arylsulfonate by reaction with an organic sulfonyl halide, obtaining therefrom the corresponding 21-iodo steroid by reaction of the said 21-alkyl or arylsulfonate with an alkali-metal iodide, and finally producing 6,9α-difluoro-11β,17α-dihydroxy-1,4-pregnadiene-3,20-dione by dehalogenating the said 21-iodo steroid with a reducing agent. If desired, the 6,9α-difluoro-21-desoxy steroid can be oxidized by reaction with chromium trioxide in acetic acid or with a haloamide or haloimide as described previously to give 6,9α-difluoro-17α-hydroxy-1,4-pregnadiene-3,11,20-trione.

In the foregoing processes, it should be understood that the corresponding 6β-halo epimer can be utilized at any stage and the 6α-epimer obtained at appropriate intermediate stages by treatment of the 6β-compound, at temperatures of zero degrees centigrade or slightly lower and in an organic solvent such as chloroform, with an anhydrous mineral acid, such as hydrochloric acid, in the presence of alcohol. Such temperatures should be maintained throughout the period of addition of the acid. The reaction mixture can then be washed with successive portions of dilute alkali and water and evaporated under reduced pressure.

The foregoing reactions are exemplified in greater detail below. It will be understood by those skilled in the art, nevertheless, that the specific order of steps may be inverted or transposed or otherwise varied to suit the purposes of economics, convenience or the like.

The following preparations and examples are illustrative of the process and products of the present invention but are not to be construed as limiting.

PREPARATION 1

*3-ethylene glycol ketal of methyl 3,11-diketo-5α,6α-oxido-17(20)-[cis]-pregnen-21-oate*

To a solution of five grams of the 3-ethylene glycol ketal of methyl 3,11-diketo-4,17(20)-[cis]-pregnadien-21-oate, prepared in the manner described in U. S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was then washed with a five percent aqueous solution of sodium biscarbonate and then with water. The chloroform layer was separated, dried and the solvent distilled to give a residue of 5.3 grams of solid. Crystallization of this solid from methanol gave 2.24 grams of product melting at 180 to 195 degrees centigrade and after two crystallizations from methanol, there was obtained pure 3-ethylene glycol ketal of methyl 3,11-diketo-5α,6α-oxido-17(20)-[cis]-pregnen-21-oate, melting at 206 and 209 degrees centigrade, having an [α]$_D$ of 37 degrees (CHCl$_3$) and the analysis given below:

*Analysis.*—Calculated for $C_{24}H_{32}O_6$: C, 69.20; H, 7.75. Found: C, 69.59; H, 7.81.

PREPARATION 2

*Methyl 3,11-diketo-5α,6β-dihydroxy-17(20)-allopregnen-21-oate and methyl 3,11-diketo-5α-hydroxy-6β-fluoro-17(20)-allopregnen-21-oate*

To a solution of 1.73 grams of 3-ethylene glycol ketal of methyl 3,11-diketo-5α,6α-oxido-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Chromatography gave two fractions: A, 481 milligrams eluted with methylene chloride plus five percent acetone and B, 921 milligrams eluted with methylene chloride plus ten and twenty percent acetone. Crystallization of fraction A from acetone-Skellysolve B hexanes gave 390 milligrams of methyl 3,11-diketo-5α-hydroxy-6β-fluoro-17(20)-allopregnen-21-oate, melting point 254 to 260 degrees centigrade. The analytical sample melted at 260 to 263 degrees centigrade.

*Analysis.*—Calculated for $C_{22}H_{29}O_5F$: F, 4.84. Found: F, 4.47.

Fraction B on crystallization from acetone-Skellysolve B hexanes gave 470 milligrams of methyl 3,11-diketo-5α,6β - dihydroxy - 17(20) - allopregnen - 21 - oate, melting point 235 to 245 degrees centigrade. The analytical sample melted at 245 to 248 degrees centigrade.

*Analysis.*—Calculated for $C_{22}H_{30}O_6$: C, 67.67; H, 7.74. Found: C, 67.91; H, 7.62.

PREPARATION 3

*Methyl 3,11 - diketo - 5α - hydroxy - 6β - fluoro - 17(20)-allopregnen-21-oate-3-ethylene ketal*

A mixture of 1.9 grams of methyl 3,11-diketo-5α-hydroxy - 6β - fluoro - 17(20) - allopregnen - 21 - oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11 - diketo - 5α - hydroxy - 6β - fluoro - 17(20)-allopregnen - 21 - oate 3 - ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol is productive of the respective 3-alkylene ketals of methyl 3,11-diketo-5α-hydroxy-6β-fluoro-17(20)-allopregnen-21-oate.

PREPARATION 4

*5α,11β,21 - trihydroxy - 6β - fluoro - 17(20) - allopregnen-3-one 3-ethylene ketal*

To a solution of 1.96 grams of methyl 3,11-diketo-5α-hydroxy - 6β - fluoro - 17(20) - allopregnen - 21 - oate 3-ethylene ketal in 850 milliliters of anhydrous ether was added 3.7 grams of lithium aluminum hydride and the mixture was stirred for a period of one hour. 200 milliliters of water was added slowly and the ether phase separated. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21 - trihydroxy - 6β - fluoro - 17(20) - allopregnen-3-one 3-ethylene ketal, melting point 197 to 205 degrees centigrade. An additional 226 milligrams was obtained from the mother liquor, melting point 175 to 185 degrees centigrade.

PREPARATION 5

5α,11β - dihydroxy - 6β - fluoro - 21 - acetoxy - 17(20)-allopregnen-3-one 3-ethylene ketal The acetate was prepared by allowing 0.87 gram of 5α,11β,21 - trihydroxy - 6β - fluoro - 17(20) - allopregnen-3-one 3-ethylene ketal to stand overnight in ten milliliters of acetic anhydride and ten milliliters of pyridine. The solution was then poured into ice water to give 0.92 gram of 5α,11β - dihydroxy - 6β - fluoro - 21 - acetoxy-17(20)-allopregnen-3-one 3-ethylene ketal, melting point to 140 to 150 degrees centigrade, which on recrystallization from acetone-Skellysolve B hexanes gave 0.77 gram, melting point 149 to 153 degrees centigrade.

Similarly, other 21-organic carboxylic esters of 5α,11β, 21 - trihydroxy - 6β - fluoro - 17(20) - allopregnen - 3-one 3-ethylene ketals are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting 5α,11β,21-trihydroxy - 6β - fluoro - 17(20) - allopregnen - 3 - one 3-ethylene ketal with an appropriate acylating agent, e. g., the anhydride or acid halide of the selected acid in a solvent such as, for example, benzene, toluene, pyridine or the like.

PREPARATION 6

5α,11β,17α - trihydroxy - 6β - fluoro - 21 - acetoxyallopregnane-3,20-dione 3-ethylene ketal To a solution of 0.77 gram of 5α,11β-dihydroxy-6β-fluoro - 21 - acetoxy - 17(20) - allopregnen - 3 - one 3-ethylene ketal in 35 milliliters of tertiary butyl alcohol was added one milliliter of pyridine, 1.9 milliliters of N-methylmorpholine oxide peroxide solution, and 13.1 milligrams of osmium tetroxide (9.1 milliliters of tertiary butyl alcohol solution containing 1.44 milligrams OsO₄ per milliliter). The solution was stirred for a period of 2.5 hours, fifteen milliliters of five percent sodium hydrosulfite added, stirred for an additional ten minutes, 0.7 gram of finely ground synthetic magnesium silicate added, stirred for a period of twenty minutes more and filtered. The filtrate was taken to dryness under reduced pressure (below fifty degrees centigrade) and the residue dissolved in methylene chloride, washed with water, dried and evaporated to dryness. This residue was crystallized from acetone-Skellysolve B hexanes to give 0.47 gram of 5α,11β,17α - trihydroxy - 6β - fluoro - 21 - acetoxyallopregnane-3,20-dione 3-ethylene ketal, melting point 220 to 228 degrees centigrade.

PREPARATION 7

5α,11β,17α - trihydroxy - 6β - fluoro - 21 - acetoxyallopregnane-3,20-dione

A solution of 0.47 gram of 5α,11β,17α-trihydroxy-6β-fluoro - 21 - acetoxyallopregnane - 3,20 - dione 3 - ethylene ketal in 35 milliliters of acetone and four milliliters of 1N sulfuric acid solution was gently boiled on the steam bath for ten minutes, cooled and neutralized with dilute sodium bicarbonate solution. Addition of water and cooling gave 0.33 gram of 5α,11β,17α-trihydroxy-6β-fluoro - 21 - acetoxyallopregnane - 3,20 - dione, melting point 230 to 240 degrees centigrade.

PREPARATION 8

6β - fluoro - 11β,17α - dihydroxy - 21 - acetoxy - 4 - pregnene-3,20-dione (6β-fluorohydrocortisone acetate)

A solution of 100 milligrams of 5α,11β,17α-trihydroxy-6β - fluoro - 21 - acetoxyallopregnane - 3,20 - dione in 4.9 milliliters of acetic acid and 0.1 milliliter of water was refluxed for a period of one hour, cooled, diluted with fifty milliliters of water and evaporated to dryness under reduced pressure. The residue was chromatographed over Florisil (synthetic magnesium silicate) to give one fraction (77 milligrams) eluted with methylene chloride plus ten percent acetone. Crystallization from acetone-Skellysolve B hexanes gaves 38 milligrams of 6β - fluoro - 11β,17α - dihydroxy - 21 - acetoxy - 4 - pregnene-3,20-dione (6β-fluorohydrocortisone acetate), melting point 210 to 218 degrees centigrade. Infrared data and ultraviolet data are in agreement with the structure.

PREPARATION 9

6α-fluoro-11β,17α-dihydroxy-21-acetoxy-4-pregnene-3,20-dione (6α-fluorohydrocortisone acetate)

A solution of 0.132 gram of 6β-fluoro-11β,17α-dihydroxy-21-acetoxy-4-pregnene-3,20-dione in twelve milliliters of chloroform and 0.1 milliliter of absolute alcohol was cooled to minus ten degrees centigrade in an ice-salt bath. A stream of anhydrous hydrochloric acid was gently bubbled through the solution for two and one-half hours, during which period the temperature was maintained between minus five and minus fifteen degrees centigrade. The solution was then diluted with 25 milliliters of chloroform, washed with dilute aqueous sodium bicarbonate solution, dried over anhydrous sodium sulfate, and evaporated to dryness under reduced pressure at sixty degrees centigrade. Crystallization of the residue from acetone-Skellysolve B hexanes solution gave 42 milligrams of the isomerized product, 6α-fluoro-11β,17α-dihydroxy-21-acetoxy-4-pregnene-3,20-dione, which melted at 203 to 210 degrees centigrade.

PREPARATION 10

6α-fluoro-11β,17α,21-trihydroxy-4-pregnene-3,20-dione (6α-fluorohydrocortisone) and the 6β-epimer thereof A solution of 1.1 grams of 6α-fluoro-11β,17α-dihydroxy-21-acetoxy-4-pregnene-3,20-dione, one gram of potassium bicarbonate, 100 milliliters of methanol and fifteen milliliters of water were mixed together and purged with nitrogen to remove dissolved oxygen while stirring at 25 degrees centigrade for four hours. The solution was then neutralized by addition of acetic acid and distilled under vacuum to remove the methanol. The residue was extracted with 100 milliliters of methylene dichloride and the extract dried over sodium sulfate and passed through a column containing eighty grams of Florisil (synthetic magnesium silicate). The fraction eluted with Skellysolve B hexanes plus twenty and thirty percent acetone weighed 770 milligrams, representing a yield of 77.5 percent. Recrystallization of a portion of this crude product from ethyl acetate-Skellysolve B hexanes gave crystals melting at 192 to 195 degrees centigrade.

Substituting 6β-fluorohydrocortisone acetate, from Preparation 8, in the foregoing procedure is productive of 6β-fluorohydrocortisone.

PREPARATION 11

6β-fluoro-17α,21-dihydroxy-4-pregnene-3,11,20-trione(6β-fluorocortisone)

To a solution of 0.5 gram of 6β-fluoro-11β,17α,21-trihydroxy-4-pregnene-3,20-dione and one milliliter of pyridine in 35 milliliters of tertiary butyl alcohol was added 250 milligrams of N-bromoacetamide. After maintaining at room temperature for sixteen hours, the reaction mixture was diluted with 25 milliliters of water containing 250 milligrams of sodium sulfite and concentrated to about twenty milliliters, at which point precipitation occurred. The thus obtained precipitate was collected on a filter and recrystallized three times from ethyl acetate and Skellysolve B hexanes to give 6β-fluoro-17α,21-dihydroxy-4-pregnene-3,11,20-trione.

Substitution of the corresponding 6α-epimer for the starting material above is productive of 6α-fluoro-17α,21-dihydroxy-4-pregnene-3,11,20-trione. Alternatively, the 6α-epimer can be obtained from the corresponding 6β-product by the procedure of Preparation 9.

PREPARATION 12

*6α-fluoro-11β,17α,21-trihydroxy-1,4-pregnadiene-3,20-dione ($\Delta^1$-6α-fluorohydrocortisone or 6α-fluoro-1-dehydrohydrocortisone) (I)*

Five 100-milliliter portions of a medium, in 250-milliliter Erlenmeyer flasks, containing one percent glucose, two percent corn steep liquor (sixty percent solids) and tap water, were adjusted to a pH of 4.9. This medium was sterilized for 45 minutes at fifteen pounds per square inch pressure and inoculated with a one to two day growth of Septomyxa affinis, A. T. C. C. 6737. The Erlenmeyer flask was shaken at room temperature (about 26 to 28 degrees centigrade) for a period of three days. At the end of this period this 500-milliliter volume was used as an inoculum for ten liters of the same glucose-corn steep liquor medium which in addition contained ten milliliters of an antifoam compound (a mixture of lard oil and octadecanol). The fermenter was placed in the water-bath, adjusted to 28 degrees centigrade and the contents stirred (300 R. P. M.) and aerated (0.3 liter air to five liters of beer). After 24 hours of incubation, when a good growth had been developed, five grams of 6α-fluorohydrocortisone acetate plus one-half gram of 3-ketobisnor-4-cholen-22-al, dissolved in 25 milliliters of dimethyl formamide, was added and the incubation carried out at the same temperature (28 degrees centigrade) and aerated for a period of 72 hours (final pH 8.3). The mycelium was filtered off and washed with water. The wash water was combined with the filtrate and the whole was extracted with three two-liter portions of a mixture of methylene-ethyl acetate (3:1). Removal of the solvent by evaporation gave 5.25 grams of crude solid which was triturated twice with four milliliters of methylene chloride to give 2.4 grams of 6α-fluoro-1-dehydrohydrocortisone of melting point 198 to 203 degrees centigrade. The analytical sample, recrystallized from acetone, melted at 202 to 204 degrees centigrade. Analysis gave $[\alpha]_D$ plus 73 degrees (dioxane) and the following:

*Analysis.*—Calcd. for $C_{21}H_{27}O_5F$: C, 66.65; H, 7.10; F, 5.02. Found: C, 66.68; H, 7.19; F, 5.49.

Substitution of the 6β-epimer for the starting material above is productive of 1-dehydro-6β-fluorohydrocortisone. The 6β-epimer can be converted to the 6α-epimer following the procedure of Preparation 9.

EXAMPLE 1

*6α-fluoro-11β,17α-dihydroxy-1,4-pregnadiene-3,20-dione (IV)*

300 milligrams of 6α-fluoro-11β,17α,21-trihydroxy-1,4-pregnadiene-3,20-dione was dissolved in three milliliters of pyridine and cooled from zero to five degrees centigrade. One-tenth of one milliliter of methane-sulfonyl chloride was added and the solution maintained at zero to five degrees centigrade. When poured into a solution of three milliliters of concentrated hydrochloric acid in fifty milliliters of water, crystalline 6α-fluoro-11β,17α,21-trihydroxy-1,4-pregnadiene-3,20-dione 21-methanesulfonate precipitated. The yield of product was 310 milligrams and melted at 200 to 202 degrees centigrade with decomposition. Infrared absorption in a mineral oil mull was as follows: 3570, 3370 centimeters$^{-1}$ (OH); 1727 centimeters$^{-1}$ (20 ketone); 1665 centimeters$^{-1}$ (conjugated ketone); 1623, 1601 centimeters$^{-1}$ ($\Delta^{1,4}$); 1360, 1342, 1172 centimeters$^{-1}$ ($OSO_2$).

A mixture of 100 milligrams of 6α-fluoro-11β,17α,21-trihydroxy - 1,4 - pregnadiene - 3,20 - dione 21-methanesulfonate and 100 milligrams of sodium iodide in five milliliters of acetone was refluxed for fifteen minutes. The solvent was removed by vacuum distillation. The crude 6α - fluoro - 21 - iodo - 11β,17α - dihydroxy-1,4-pregnadiene-3,20-dione (III) was not isolated but dissolved in two milliliters of acetic acid. After fifteen minutes enough aqueous sodium thiosulfate was added to discharge the iodine color. The reaction solution was poured into dilute potassium carbonate solution. The crude product was filtered. It weighed 65 milligrams. Several recrystallizations from ethyl acetate yielded seventeen milligrams of 6α-fluoro-11β,17α-dihydroxy-1,4-pregnadiene-3,20-dione with a melting point of 271 to 274 degrees centigrade. The infrared maximums in mineral oil mull are as follows: 3390 centimeters$^{-1}$ (OH); 1705 centimeters$^{-1}$ (ketone); 1652 centimeters$^{-1}$ (conjugated ketone); 1613, 1597 centimeters$^{-1}$ ($\Delta^{1,4}$).

*Analysis.*—Calcd. for $C_{21}H_{27}FO_4$: C, 69.59; H, 7.51; F, 5.24. Found: C, 70.07; H, 7.71; F, 4.29.

EXAMPLE 2

*6α-fluoro-17α-hydroxy-1,4-pregnadiene-3,11,20-trione*

A mixture was prepared containing 0.3 gram of 6α-fluoro-11β,17α-dihydroxy-1,4-pregnadiene-3,20-dione, 100 milligrams of chromic anhydride, ten milliliters of glacial acetic acid and 0.5 milliliter of water. This mixture was stirred and maintained at room temperature for eight hours. It was then poured into fifty milliliters of ice water, neutralized by the addition of dilute sodium hydroxide. The crude product that precipitated was collected on a filter and recrystallized three times from ethyl acetate and Skellysolve B hexanes to give 6α-fluoro-17α-hydroxy-1,4-pregnadiene-3,11,20-trione.

EXAMPLE 3

*6β-epimers*

Instead of the 1-dehydro-6α-fluorohydrocortisone or 1-dehydro-6α-fluorocortisone, the 6β-fluoro epimers can be used as starting material, in which case the 6β-fluoro-11β,17α - dihydroxy - 1,4 - pregnadiene - 3,20 - dione and 6β-fluoro - 17α - hydroxy - 1,4 - pregnadiene-3,11,20-trione, can be isolated from the reaction mixture. The thus-obtained β-epimers yield the 6α-epimers by treatment with acid or base in an organic solvent, e. g., ethanol at room temperature.

EXAMPLE 4

*6α-fluoro-17α-hydroxy-1,4-pregnadiene-3,11,20-trione*

Treating 1-dehydro-6α-fluorocortisone with methanesulfonyl chloride in pyridine solution yielded 6α-fluoro-17α,21 - dihydroxy - 1,4 - pregnadiene - 3,11,20 - trione 21-methanesulfonate; refluxing the thus-obtained 6α-fluoro - 17α,21 - dihydroxy - 1,4 - pregnadiene - 3,11,20-trione 21-methanesulfonate with potassium iodide in acetone yielded 6α-fluoro - 17α - hydroxy - 21 - iodo-1,4-pregnadiene-3,11,20-trione, and reducing with sodium thiosulfate the 6α-fluoro - 17α - hydroxy - 21 - iodo-1,4-pregnadiene-3,11,20-trione yielded 6α-fluoro-17α-hydroxy-1,4-pregnadiene-3,11,20-trione.

EXAMPLE 5

*6α,9α-difluoro-11β,17α-dihydroxy-1,4-pregnadiene-3,20-dione*

A mixture of one gram of 6α-fluoro-11β,17α-dihydroxy-1,4-pregnadiene-3,20-dione, 650 milligrams of N-bromoacetamide and six milliliters of pyridine were stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.75 gram of 6α-fluoro-17α-hydroxy-1,4,9(11)-pregnatriene-3,20-dione.

0.5 gram of 6α-fluoro-17α-hydroxy-1,4,9(11)-pregnatriene-3,20-dione was dissolved in twenty milliliters of methylene chloride and thereto was added a solution of one milliliter of 71 percent perchloric acid in ten milliliters of water and 200 milligrams of N-bromoacetamide in fifty milliliters of tertiary butyl alcohol. The solution was maintained at room temperature for fifteen minutes and then mixed with a solution of 0.3 gram of sodium sulfite in twelve milliliters of water. The mixture was distilled at reduced pressure until the residual solution became cloudy. The product was then precipitated by the addition of 100 milliliters of a mixture of ice water. The white crystalline precipitate was filtered, washed with water and then dried and recrystallized from a mixture of acetone and Skellysolve B hexane hydrocarbons to give 6α-fluoro-9α-bromo-11β,17α-dihydroxy-1,4-pregnadiene-3,20-dione.

A mixture of 0.45 gram of 6α-fluoro-9α-bromo-11β,17α-dihydroxy-1,4-pregnadiene-3,20-dione, 0.45 gram of anhydrous potassium acetate and twenty milliliters of acetone was heated at its refluxing temperature for five hours. The mixture was then cooled and poured into water and extracted with methylene chloride. The methylene chloride extract was dried and poured over a column of 25 grams of Florisil synthetic magnesium silicate. The column was developed with Skellysolve B hexane hydrocarbons containing increasing portions of acetone. The Skellysolve B plus ten percent acetone eluate contained 9(11)-oxido-17α-hydroxy-6α-fluoro-1,4-pregnadiene-3,20-dione.

A solution of one gram of 9(11)-oxido-17α-hydroxy-6α-fluoro-1,4-pregnadiene-3,20-dione was dissolved in fifty milliliters of methylene chloride and thereto was added five milliliters of 48 percent hydrofluoric acid and 0.5 milliliter of 71 percent perchloric acid. The mixture was stirred vigorously for six hours and then poured into an excess of cold aqueous five percent sodium bicarbonate solution. The methylene chloride layer was separated, dried with anhydrous sodium sulfate, and then poured over a column of 100 grams of Florisil synthetic magnesium silicate. The column was developed with Skellysolve B hexanes and acetone, the fractions containing ten percent acetone were recrystallized from acetone and Skellysolve B hexanes to give pure 6α,9α-difluoro-11β,17α-dihydroxy-1,4-pregnadiene-3,20-dione.

EXAMPLE 6

6α,9α - difluoro - 17α - hydroxy - 1,4 - pregnadiene - 3,11,20-trione

A mixture was prepared containing 0.3 gram of 6α,9α-difluoro - 11β,17α - dihydroxy - 1,4 - pregnadiene - 3,20-dione, 100 milligrams of chromic anhydride, ten milliliters of glacial acetic acid and 0.5 milliliter of water. This mixture was stirred and maintained at room temperature for eight hours. The mixture was poured into fifty milliliters of ice water and neutralized with dilute sodium hydroxide. A precipitate was formed and was collected on a filter. The precipitate was recrystallized three times from a mixture of ethyl acetate and Skellysolve B. The purified product was 6α,9α-difluoro-17α-hydroxy-1,4-pragnadiene-3,11,20-trione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound selected from the group consisting of 6 - fluoro - 11β,17α - dihdroxy - 1,4 - pregnadiene - 3,20-dione and 6-fluoro-17α-hydroxy-1,4-pregnadiene-3,11,20-trione.

2. 6 - fluoro - 11β,17α - dihydroxy - 1,4 - pregnadiene 3,20-dione.

3. 6α - fluoro - 11β,17α - dihydroxy - 1,4 - pragnadiene-3,20-dione.

4. 6 - fluoro - 17α - hydroxy - 1,4 - pregnadiene-3,11,20-trione.

5. 6α - fluoro - 17α - hydroxy - 1,4 - pragnadiene - 3,11,20-trione.

6. A compound of the formula:

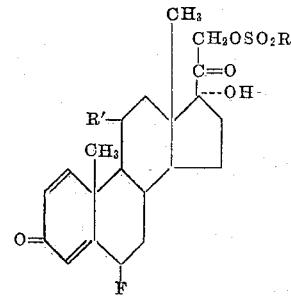

wherein R is a hydrocarbon radical containing from one to ten carbon atoms, inclusive, and R' is a member selected from the group consisting of hydroxy and keto.

7. A compound selected from the group consisting of 6α - fluoro - 21 - iodo - 11β,17α - dihydroxy - 1,4 - pregnadiene-3,20-dione and 6α - fluoro - 21 - iodo - 17α - hydroxy - 1,4 - pregnadiene - 3,11,20-trione.

8. 6 - fluoro - 21 - iodo - 11β,17α-dihydroxy - 1,4 - pregnadiene-3,20-dione.

References Cited in the file of this patent
UNITED STATES PATENTS

| | | |
|---|---|---|
| 2,783,226 | Gould et al. | Feb. 26, 1957 |
| 2,816,121 | Gould et al. | Dec. 10, 1957 |
| 2,816,902 | Gould et al. | Dec. 17, 1957 |
| 2,819,264 | Gould et al. | Jan. 7, 1958 |